United States Patent
Boyle, Jr. et al.

(10) Patent No.: US 7,406,595 B1
(45) Date of Patent: Jul. 29, 2008

(54) METHOD OF PACKET ENCRYPTION THAT ALLOWS FOR PIPELINING

(75) Inventors: Vincent Michael Boyle, Jr., Aberdeen, MD (US); Christopher Mark Salter, Columbia, MD (US)

(73) Assignee: The United States of America as represented by the Director, National Security Agency, Washington, DC (US)

( * ) Notice: Subject to any disclaimer, the term of this patent is extended or adjusted under 35 U.S.C. 154(b) by 828 days.

(21) Appl. No.: 10/843,637

(22) Filed: May 5, 2004

(51) Int. Cl.
*H04L 9/00* (2006.01)
(52) U.S. Cl. ........................... 713/160; 708/521
(58) Field of Classification Search .............. 713/160, 713/189; 708/233, 521
See application file for complete search history.

(56) References Cited

U.S. PATENT DOCUMENTS

| | | | |
|---|---|---|---|
| 4,910,777 A | 3/1990 | Larson et al. | |
| 5,594,869 A | 1/1997 | Hawe et al. | |
| 5,684,876 A | 11/1997 | Pinder et al. | |
| 5,898,784 A | 4/1999 | Kirby et al. | |
| 6,052,466 A | 4/2000 | Wright | |
| 6,170,057 B1 | 1/2001 | Inoue et al. | |
| 6,185,680 B1 | 2/2001 | Shimbo et al. | |
| 6,219,791 B1 | 4/2001 | Blanchard et al. | |
| 7,110,545 B2 * | 9/2006 | Furuya et al. | 380/259 |
| 2002/0002675 A1 | 1/2002 | Bush | |
| 2002/0023209 A1 | 2/2002 | Domstedt et al. | |
| 2002/0129243 A1 | 9/2002 | Nanjundiah | |
| 2003/0131233 A1 | 7/2003 | Garstin et al. | |

OTHER PUBLICATIONS

Charanjit S. Jutla, "Encryption Modes with Almost Free Message Integrity", IBM T.J. Watson Research Center.

* cited by examiner

*Primary Examiner*—Gilberto Barron, Jr.
*Assistant Examiner*—Devin Almeida
(74) *Attorney, Agent, or Firm*—Robert D. Morelli

(57) ABSTRACT

A method of packet encryption and decryption that allows for pipelining. The first step is to identify the packets in a message to be encrypted. Then, a unique number is assigned to each packet. A value R is acquired. Then, a first register is initialized. An initialization vector IV is generated. Then, the first register is stepped a user-definable number of times. Then, a packet is selected. R and the unique number are combined. Then, a second register is initialized. A checksum is generated. Then, the packet is divided into blocks. A block is selected. Then, the checksum is combined with the block and designated the checksum. The block is encrypted. Then, the first and second registers are stepped. These steps are repeated for each block. Then, the checksum is encrypted. After the blocks are encrypted, the unique number, IV, the ciphertext of each block, and the encrypted checksum are transmitted. If there are any other packets to encrypt then the steps are repeated.

30 Claims, 2 Drawing Sheets

METHOD OF PACKET ENCRYPTION THAT ALLOWS FOR PIPELINING

FIELD OF THE INVENTION

This invention relates to cryptography and, more particularly, to block/data stream enciphering.

BACKGROUND OF THE INVENTION

With ever increasing usage of the Internet for transmitting messages comes an increasing need to secure such communications. The most obvious way to secure Internet traffic is to encrypt it. However, the protocol for transmitting messages over the Internet (i.e., the Internet Protocol or IP) is packet based. That is, a message to be transmitted is divided into sections or packets and transmitted separately so that different packets may take different routes to arrive at the intended destination, based on the availability of a route. This allows for more reliable and efficient transmission since a dedicated line need not be established between the sender and receiver for the entire duration of the transmission and the loss of a route does not halt the transmission of the packets. The packets will be sent over the route that is available at the time. However, the packets may not arrive at the intended destination in the order that they appear in the message. Therefore, information must be added to each packet to indicate how the packets are to be reconstructed by the receiver to recover the intended message. This added information is often referred to as header information or information added to the header of a packet.

Sending messages in packet form is efficient from a transmission standpoint but causes problems from a security standpoint. If the encryption method used to encrypt packets requires the packets to be decrypted in the order they appear in the message then decryption cannot start until all packets are received. Since many messages are transmitted at the same time over the Internet by interspersing the packets of various messages, a bottleneck of packets awaiting decryption may accumulate at a receiver until all of the packets of a particular message arrive. This is undesirable from a network performance standpoint. Therefore, there is a need for a IP encryption method that allows for the decryption of an encrypted packet as soon as it is received by a receiver. Since users of the Internet value increased performance, an encryption method that allows for efficient encryption and decryption is highly desired. Pipelining is a method of attaining efficiency. It makes use of the fact that most block encryption algorithms are composed of one function repeated numerous times to encrypt a block of plaintext. Pipelining is achieved by replicating the function employed, in hardware or in software, as many times as it is repeated to achieve the result. This allows successive blocks of plaintext to be processed as soon as the first block has finished the first step in the pipelined process. Anytime a block moves to another process in the pipeline, a new block may be processed. The efficiency of a non-pipelined block cipher that takes n steps can be improved n times by pipelining it. Therefore, a pipelined method of encrypting and decrypting Internet Protocol transmission is needed.

The Encapsulating Security Payload (ESP) is a protocol for providing encryption and authentication of data packets transmitted over the Internet. ESP uses a hash algorithm to provide authentication. Hash algorithms cannot be pipelined. Therefore, ESP is not as efficient as a pipelined algorithm.

A cryptographic algorithm, such as a codebook, may be used in various cryptographic modes by configuring the algorithm with different types of feedback and incorporating different types of logic functions. Three well known modes for cryptographic codebooks are Electronic Codebook Mode (ECB), Cipher Block Chaining Mode (CBC), and Counter Mode (CM).

ECB may be pipelined. However, by repeating plaintext blocks (i.e., repeating parts of a message in its unscrambled form), ECB will repeat blocks of ciphertext (i.e., parts of a scrambled message will repeat). Such repeats give unintended recipients information about the encryption process that could help them acquire the plaintext message. It is preferred that a cryptographic algorithm not provide such information.

In CM, a counter (typically a one-up counter, but other counts are possible) provides input to the cryptographic codebook. The output along with plaintext is processed by an exclusive-or function to produce ciphertext. CM may be pipelined. However, changing bits in CM ciphertext produces predictable changes to CM plaintext, another characteristic to be avoided.

CBC doesn't have the characteristic that a repeat of a plaintext block produces a repeat of a ciphertext block. However, CBC cannot be pipelined because the encryption of a next plaintext block cannot start until the encryption of a previous plaintext block is completed. Therefore, CBC is not as efficient as a pipelined method.

The National Institute of Standards and Technology (NIST), an agency of the U.S. Department of Commerce's Technology Administration, announced the approval of the Federal Information Processing Standard (FIPS) for the Advanced Encryption Standard (AES) as described in FIPS Publication 197 (FIPS PUB 197), which is hereby incorporated by reference into the present specification. This standard specifies a symmetric encryption algorithm that may be used by U.S. Government organizations to protect sensitive, but unclassified, information. The AES was designed to replace the Data Encryption Standard (DES). However, Triple DES remains an approved algorithm for U.S. Government use for the foreseeable future. Single DES is being phased out and is currently permitted only in legacy systems. DES and Triple DES are described in FIPS PUB 46-3, which is incorporated by reference into the specification of the present invention.

An article by Charanjit S. Jutla entitled "Encryption Modes with Almost Free Message Integrity," published on Dec. 8, 2000, discloses a method of operation for block encryption which provides confidentiality of data and message integrity. The present invention does not use the method disclosed in this article.

U.S. Pat. No. 4,910,777, entitled "PACKET SWITCHING ARCHITECTURE PROVIDING ENCRYPTION ACROSS PACKETS," discloses a device for and method of encrypting a flag in each packet, and leaving the rest of the packet unencrypted, before transmission and transmitting special packets to achieve syncronization with the decryptor. The present invention does not encrypt a flag, leave the rest of a packet unencrypted, and transmit special packets to achieve synchronization. U.S. Pat. No. 4,910,777 is hereby incorporated by reference into the specification of the present invention.

U.S. Pat. No. 5,594,869, entitled "METHOD AND APPARATUS FOR END-TO-END ENCRYPTION OF A DATA PACKET IN A COMPUTER NETWORK," discloses a device for and method of encrypting packets for a specific network protocol using programmable registers for identifying the specific protocol, whether or not decryption should be performed, and the starting location for decryption. The present invention does not use such programmable registers. U.S. Pat. No. 5,594,869 is hereby incorporated by reference into the specification of the present invention.

U.S. Pat. No. 5,684,876, entitled "APPARATUS AND METHOD FOR CIPHER STEALING WHEN ENCRYPTING MPEG TRANSPORT PACKETS," discloses a device for and method of encrypting packets, where each packet is parsed into a first part, a second part, and a residual part. The second part and the residual part are encrypted using a block cipher to form a first encrypted block. The first encrypted block is parsed into a third part and a fourth part. The first part and the third part are encrypted to form a second encryption block. The present invention does not use such an encryption scheme. U.S. Pat. No. 5,684,876 is hereby incorporated by reference into the specification of the present invention.

U.S. Pat. No. 5,898,784, entitled "TRANSFERRING ENCRYPTED PACKETS OVER A PUBLIC NETWORK," discloses a method of passing encrypted network packets to a computer on an internal network, examining a field in each network packet to determine which encryption algorithm was used to encrypt the network packet, determining which virtual tunnel each network packet was sent over and routing the same in accordance with its virtual tunnel, and encrypting network packets for transmission over internal and public networks connected to a network interface computer. The present invention does not use such a method. U.S. Pat. No. 5,898,784 is hereby incorporated by reference into the specification of the present invention.

U.S. Pat. No. 6,052,466, entitled "ENCRYPTION OF DATA PACKETS USING A SEQUENCE OF PRIVATE KEYS GENERATED FROM A PUBLIC KEY EXCHANGE," discloses a device for and method of partitioning a cipher stream into a sequence of secondary keys. The secondary keys are then used to encrypt packets either one key per packet or one key for all the packets. An index of the keys are sent to the receiver so that it knows what keys to use to decrypt the encrypted packets. The present invention does not use such a method. U.S. Pat. No. 6,052,466 is hereby incorporated by reference into the specification of the present invention.

U.S. Pat. No. 6,170,057, entitled "MOBILE COMPUTER AND METHOD OF PACKET ENCRYPTION AND AUTHENTICATION IN MOBILE COMPUTING BASED ON SECURITY POLICY OF VISITED NETWORK," discloses a device for and method of controlling the activation of packet encryption and authentication. The present invention does not use such a method. U.S. Pat. No. 6,170,057 is hereby incorporated by reference into the specification of the present invention.

U.S. Pat. No. 6,185,680, entitled "PACKET AUTHENTICATION AND PACKET ENCRYPTION/DECRYPTION SCHEME FOR SECURITY GATEWAY," discloses a device for and method of packet authentication, encryption, and decryption using link-by-link authentication and determining whether or not to encrypt or decrypt a packet based on information on a computer, encryption information, signature information, or information in the packet. The present invention does not use such a method. U.S. Pat. No. 6,185,680 is hereby incorporated by reference into the specification of the present invention.

U.S. Pat. No. 6,219,791, entitled "METHOD AND APPARATUS FOR GENERATING AND VERIFYING ENCRYPTED DATA PACKETS," discloses a device for and method of embedding error detection codes in the encrypted packets and checking the same to prevent the transmission of erroneously encrypted packets. The present invention does not use such a method. U.S. Pat. No. 6,219,791 is hereby incorporated by reference into the specification of the present invention.

U.S. Pat. Appl. No. US 2002/0002675 A1, entitled "SECURE ENCRYPTION OF DATA PACKETS FOR TRANSMISSION OVER UNSECURED NETWORKS," discloses a device for and method of using pure random numbers from a one-time pad to encrypt and order encrypted bytes of a packet. The present invention does not use such a method. U.S. Pat. Appl. No. US 2002/0002675 A1 is hereby incorporated by reference into the specification of the present invention.

U.S. Pat. Appl. No. US 2002/0023209 A1, entitled "ENCRYPTION AND DECRYPTION OF DIGITAL MESSAGES IN PACKET TRANSMITTING NETWORKS," discloses a device for and method of encrypting packets of varying lengths using an encryption algorithm that varies depending on the plaintext to be encrypted. The present invention does not use such a method. U.S. Pat. Appl. No. US 2002/0023209 A1 is hereby incorporated by reference into the specification of the present invention.

U.S. Pat. Appl. No. US 2002/0129243 A1, entitled "SYSTEM FOR SELECTIVE ENCRYPTION OF DATA PACKETS," discloses a device for and method of encrypting only certain of the packets and leaving the rest unencrypted. The present invention does not use such a method. U.S. Pat. Appl. No. US 2002/0129243 A1 is hereby incorporated by reference into the specification of the present invention.

U.S. Pat. Appl. No. US 2003/0131233 A1, entitled "EFFICIENT PACKET ENCRYPTION METHOD," discloses a method of encrypting packets using an S-vector, the sequence numbers, and two other variables to encrypt successive packets. The present invention does not use such a method. U.S. Pat. Appl. No. US 2003/0131233 A1 is hereby incorporated by reference into the specification of the present invention.

SUMMARY OF THE INVENTION

It is an object of the present invention to encrypt and decrypt a message in packet form.

It is another object of the present invention to encrypt and decrypt a message in packet form to allow for pipelining during encryption and decryption.

The present invention is a method of encrypting and decrypting messages in packet form where encryption, decryption, and data integrity may all be pipelined.

The first step of the encryption method is identifying each packet in a message to be encrypted.

The second step of the encryption method is assigning a unique number to each packet.

The third step of the encryption method is acquiring a value R.

The fourth step of the encryption method is initializing a first register with R.

The fifth step of the encryption method is generating an initialization vector IV.

The sixth step of the encryption method is stepping the first register a user-definable number of times.

The seventh step of the encryption method is selecting a packet.

The eighth step of the encryption method is combining R and the unique number.

The ninth step of the method is initializing a second register with the result of the last step.

The tenth step of the encryption method is generating a checksum.

The eleventh step of the method is dividing the packet into blocks.

The twelfth step of the encryption method is selecting another block from the packet.

The thirteenth step of the encryption method is combining the checksum with the block and designating the result as the checksum.

The fourteenth step of the encryption method is encrypting the block as a function of the first and second registers and designating the result as ciphertext of the block.

The fifteenth step of the encryption method is stepping the first and second registers.

If there is another block to process then the sixteenth step of the encryption method is returning to the twelfth step. Otherwise, proceeding to the next step.

The seventeenth step of the encryption method is encrypting the checksum.

The eighteenth step of the encryption method is transmitting the unique number, IV, the ciphertext of each block, and the encrypted checksum.

If there is another packet to encrypt then the nineteenth, and final, step of the encryption method is stepping the first register and returning to the fifth step. Otherwise, stopping.

The first step of the pipelined decryption method of the present method is receiving transmission of an encrypted packet, where the transmission includes a unique number, an initialization vector IV, at least one ciphertext block, and an encrypted checksum.

The second step of the decryption method is acquiring a value R, where R is equal to a corresponding value used to create the encrypted packet.

The third step of the decryption method is setting a second checksum equal to the unique number.

The fourth step of the decryption method is decrypting IV using an inverse of a method used to form IV.

The fifth step of the decryption method is initializing a first register with the result of the last step.

The sixth step of the decryption method is stepping the first register a number of times equal to a number of times an equivalent register was stepped after IV was formed during encryption.

The seventh step of the decryption method is combining R and the unique number.

The eighth step of the decryption method is initializing a second register with the result of the last step.

The ninth step of the decryption method is selecting a ciphertext block.

The tenth step of the decryption method is combining the ciphertext block with the contents of the second register.

The eleventh step of the decryption method is decrypting the result of the last step using an inverse of a method used to encrypt the ciphertext block.

The twelfth step of the decryption method is combining the result of the last step with the contents of the first register to form a plaintext block.

The thirteenth step of the decryption method is combining the second checksum with the result of the last step.

The fourteenth step of the decryption method is setting the second checksum equal to the result of the last step.

The fifteenth step of the decryption method is stepping the first and second registers.

If there is another ciphertext block to process then the sixteenth step of the decryption method is returning to the ninth step of the decryption method. Otherwise, proceeding to the next step.

The seventeenth step of the decryption method is stepping the first register.

The eighteenth step of the decryption method is combining the encrypted checksum with the result of the seventh step.

The nineteenth step of the decryption method is decrypting the result of the last step using an inverse of a method used to form the encrypted checksum.

The twentieth step of the decryption method is combining the contents of the first register with the result of the last step.

The twenty-first step of the decryption method is comparing the second checksum to the result of the last step.

The twenty-second, and last, step of the decryption method is accepting the plaintext blocks as valid if a match is found in the last step. Otherwise, declaring the plaintext blocks invalid.

DETAILED DESCRIPTION

The present invention is a method of encrypting a message in packet form which allows for pipelining during encryption decryption.

Figure 1:
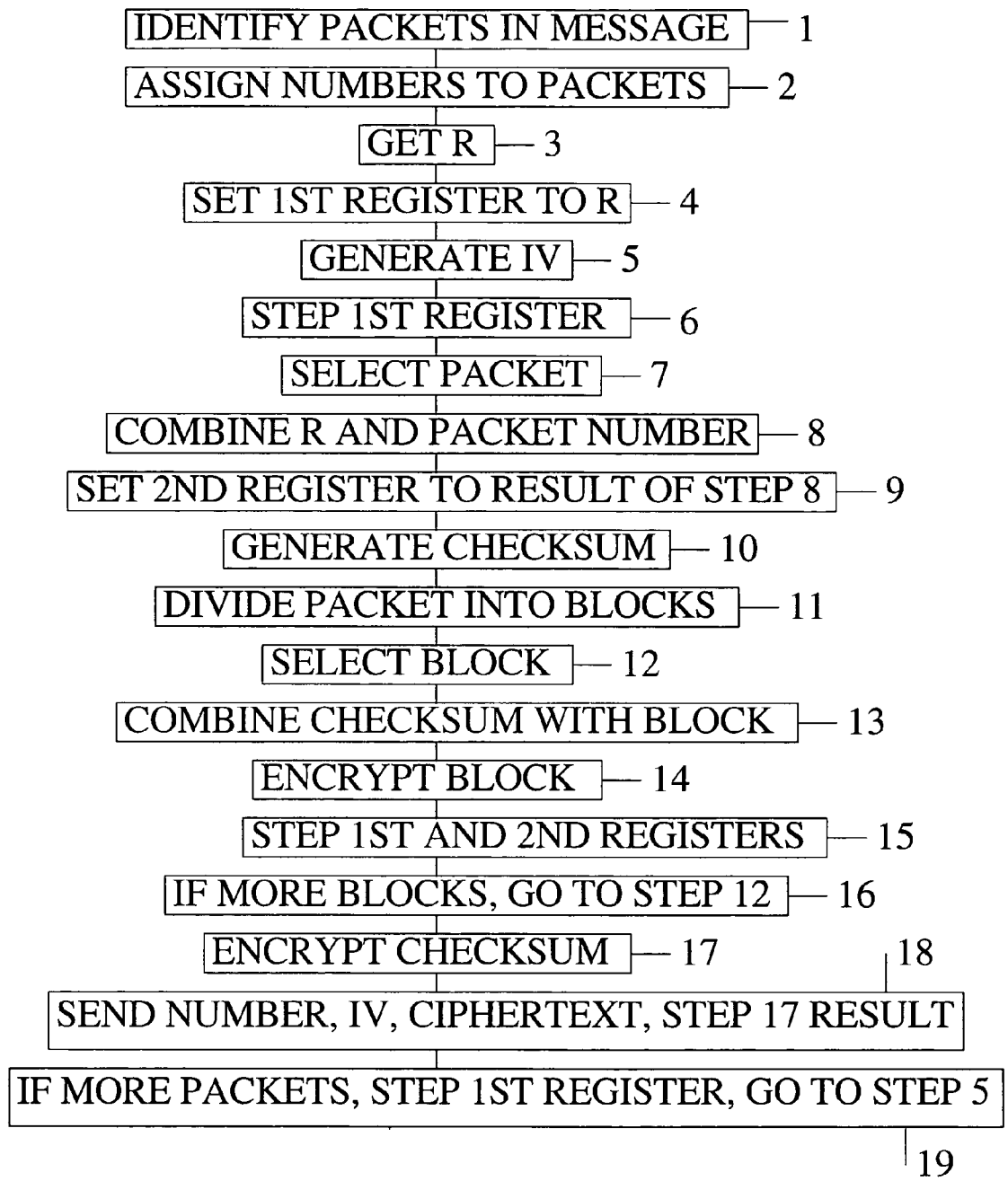
FIG. 1 is a list of the packet encryption steps of the present invention.

FIG. 1 is a list of the encryption steps of the present invention.

The first step 1 of the encryption method is identifying each packet in a message to be encrypted.

The second step 2 of the encryption method is assigning a unique number to each packet. In the preferred embodiment, the unique number is the sequence number of the packet in the message. However, any other suitable or equivalent value for a unique number may be used.

The third step 3 of the encryption method is acquiring a value R of width w, where w is a user-definable integer. In the preferred embodiment, the methods of acquiring the value R include acquiring a value R of width w, where w is $2^n$, where n is a user-definable integer, acquiring R by generating R, acquiring R through key exchange, and acquiring R through key agreement. In the preferred embodiment, w is equal to the width of the codebook encryptor used in subsequent steps of the present method.

The fourth step 4 of the encryption method is initializing a first register of width w with R, where the first register is configured to step. In the preferred embodiment, the first register is initialized with R and configured to step as a primitive polynomial.

The fifth step 5 of the encryption method is generating an initialization vector IV that is a function of the contents of the first register. In the preferred embodiment, IV is generated by encrypting the contents of the first register, setting IV equal to the encrypted result, and stepping the first register a user-definable number of times. The encryption method further includes the step of acquiring a cryptovariable CV, which is used during encryption, and a security parameter index SPI. In the preferred embodiment, the encryptor used to encrypt the contents of the first register includes a codebook encryptor such as the Data Encryption Standard (DES) codebook encryptor, the Advanced Encryption Standard (AES) codebook encryptor, and any other suitable or equivalent codebook encryptor.

The sixth step 6 of the encryption method is stepping the first register a user-definable number of times.

The seventh step 7 of the encryption method is selecting a packet that has not been processed.

The eighth step 8 of the encryption method is combining R and the unique number of the selected packet. In the preferred embodiment, R and the unique number are combined using a function that includes exclusive-or addition, modulo $2^w$ addition, and vector addition of n modulo $2^{w/n}$ additions, where n is a user-definable integer.

The ninth step 9 of the encryption method is initializing a second register of width w with the result of the eighth step 8, where the second register is configured to step. In the preferred embodiment, the second register is initialized and configured to step as a primitive polynomial.

The tenth step 10 of the encryption method is generating a checksum. In the preferred embodiment, the checksum is generating by combining the unique number of the selected packet and SPI. The method of combining the unique number and SPI includes concatenating the unique number and SPI, in any order.

The eleventh step 11 of the encryption method is dividing the selected packet into blocks of width w, padding any block to width w if necessary. Padding may occur in any suitable manner (e.g., padding to the right, padding to the left, random padding) with any suitable values (i.e., 0s, 1s, any combination thereof). In the preferred embodiment, the final block is padded.

The twelfth step 12 of the encryption method is selecting a block from the selected packet that has not been processed.

The thirteenth step 13 of the encryption method is combining the checksum with the selected block and designating the result as the checksum. In the preferred embodiment, the checksum is combined with the selected block using a combination function that includes exclusive-or addition, modulo $2^w$ addition, and vector addition of n modulo $2^{w/n}$ additions, where n is a user-definable integer.

The fourteenth step 14 of the encryption method is encrypting the selected block as a function of the contents of the first register and the second register and designating the result as ciphertext of the selected block. In the preferred embodiment, the selected block is encrypted by combining the contents of the first register with the selected block, encrypting the combination of the first register and the selected block using a codebook encryptor and CV, and combining the encrypted combination of the first register and the selected block with the contents of the second register. In the preferred embodiment, the codebook encryptor includes the DES codebook encryptor, the AES codebook encryptor, and any other suitable or equivalent codebook encryptor.

The fifteenth step 15 of the encryption method is stepping the first register and the second register a user-definable number of times.

If a block in the selected packet has not been processed then the sixteenth step 16 of the encryption method is returning to the twelfth step 12. Otherwise, proceeding to the next step.

The seventeenth step 17 of the encryption method is encrypting the checksum. In the preferred embodiment, the checksum is encrypted by stepping the first register a user-definable number of times, combining the contents of the first register with the checksum, encrypting the combination of the first register and the checksum using a codebook encryptor and CV, and combining the encrypted combination of the first register and the checksum with the result of the eighth step 8. In the preferred embodiment, the codebook encryptor includes the DES codebook encryptor, the AES codebook encryptor, and any other suitable or equivalent codebook encryptor.

The eighteenth step 18 of the encryption method is transmitting the unique number of the selected packet, IV, the ciphertext of each block in the selected packet, and the encrypted checksum. The encryption method further includes transmitting the SPI.

If a packet in the message has not been processed then the nineteenth, and final, step 19 of the encryption method is stepping the first register a user-definable number of times and returning to the fifth step 5. Otherwise, stopping.

Figure 2:
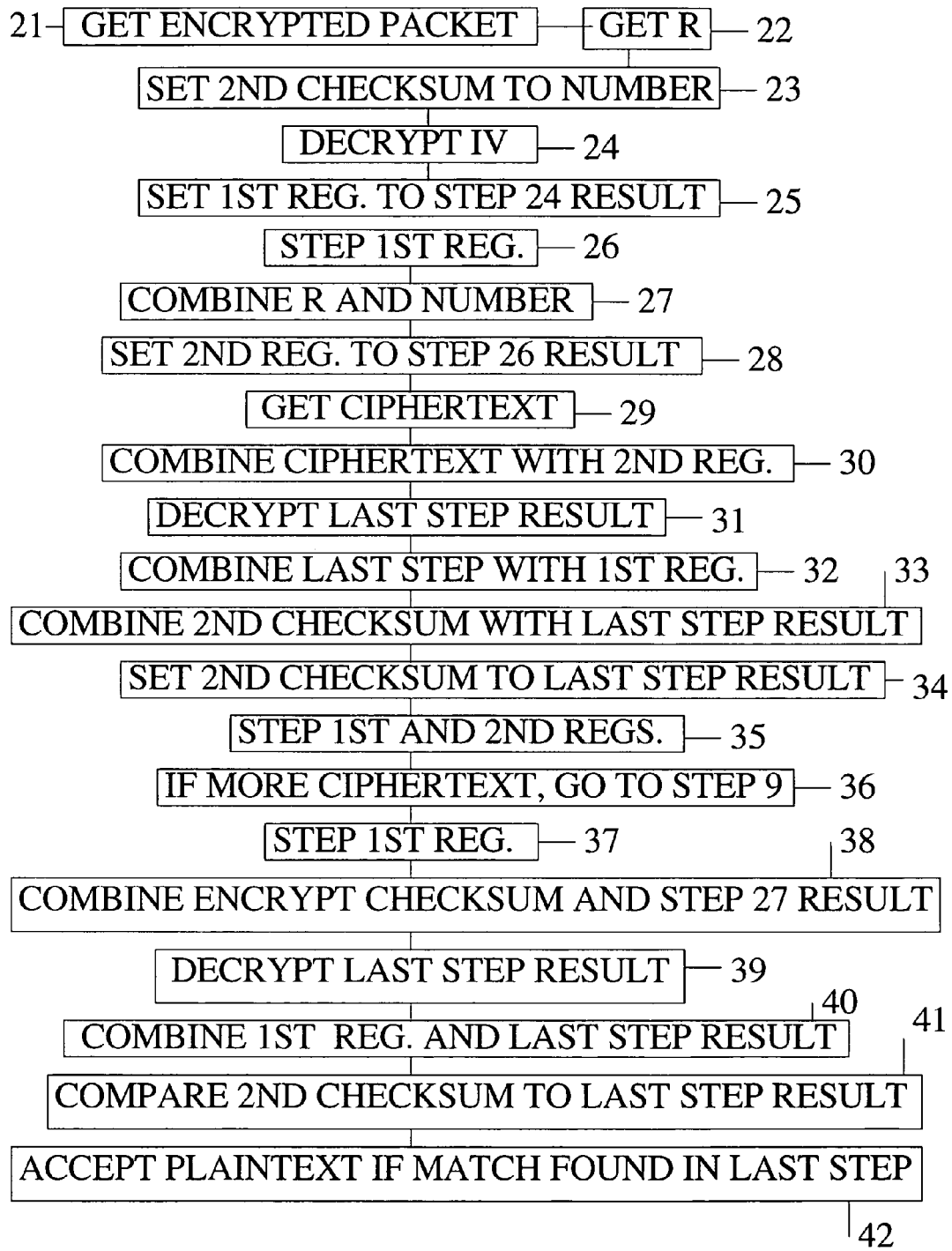
FIG. 2 is a list of the packet decryption steps of the present invention.

FIG. 2 is a list of steps for the pipelined decryption method of the present invention which decrypts what the method of FIG. 1 encrypts. Pipelining is an efficient method of processing. It achieves its superior performance by doing steps in parallel rather than serially. In the decryption method of the present invention, decryption of an encrypted packet is initiated while a value that is needed to complete decryption of the encrypted packet is generated. The value appears just before it is needed to complete decryption of the encrypted packet. Therefore, no extra processing cycles are needed to perform decryption as are required by prior art methods.

The first step 21 of the decryption method of FIG. 2 is receiving a transmission of an encrypted packet, where the transmission includes a unique number for the encrypted packet, an initialization vector IV, at least one ciphertext block, and an encrypted checksum.

The second step 22 of the decryption method is acquiring a value R of width w, where w is a user-definable integer, and where R is equal to a corresponding value used to create the received transmission. In the preferred embodiment, w is equal to the width of the codebook encryptor used to generate the encrypted packet.

The third step 23 of the decryption method is setting a second checksum equal to the unique number.

The fourth step 24 of the decryption method is decrypting IV using an inverse of a method used to form IV. The decryption method further includes acquiring a cryptovariable CV that is the same as a corresponding value used to create the received transmission and receiving a security parameter index SPI. The decryption method further includes the step of setting the second checksum to a combination of the unique number of the encrypted packet and SPI. In the preferred embodiment, the unique number of the encrypted packet and SPI are combined by concatenating the unique number of the encrypted packet and SPI.

The fifth step 25 of the decryption method is initializing a first register of width w with the result of the fourth step 24, where the first register is configured to step. In the preferred embodiment, the first register is initialized with the result of the fourth step 24, where the first register is configured to step as a primitive polynomial.

The sixth step 26 of the decryption method is stepping the first register a number of times equal to the number of times that the first register in the encryption method was stepped after IV was generated (i.e., the fifth step 5 of the encryption method described above and listed in FIG. 1).

The seventh step 27 of the decryption method is combining R and the unique number. In the preferred embodiment, R and the unique number are combined using a combination function that includes exclusive-or addition, modulo $2^w$ addition, and vector addition of n modulo $2^{w/n}$ additions, where n is a user-definable integer.

The eighth step 28 of the decryption method is initializing a second register of width w with the result of the seventh step 27, where the second register is configured to step. In the preferred embodiment, the second register is initialized with the result of the seventh step 27, where the second register is configured to step as a primitive polynomial.

The ninth step 29 of the decryption method is selecting one of the ciphertext blocks.

The tenth step 30 of the decryption method is combining the selected ciphertext block with the contents of the second register. In the preferred embodiment, the selected cipher block is combined with the contents of the second register using a combination function that includes exclusive-or addition, modulo $2^w$ addition, and vector addition of n modulo $2^{w/n}$ additions, where n is a user-definable integer.

The eleventh step 31 of the decryption method is decrypting the result of the tenth step 30 using an inverse of a method used to encrypt the selected ciphertext block.

The twelfth step 32 of the decryption method is combining the result of the eleventh step 31 with the contents of the first register to form a plaintext block of the selected ciphertext block. In the preferred embodiment, the result of the eleventh step 31 is combined with the contents of the first register using a combination function that includes exclusive-or addition, modulo $2^w$ addition, and vector addition of n modulo $2^{w/n}$ additions, where n is a user-definable integer.

The thirteenth step 33 of the decryption method is combining the second checksum with the result of the twelfth step 32. In the preferred embodiment, the second checksum is combined with the result of the twelfth step 32 using a combination function that includes exclusive-or addition, modulo $2^w$ addition, and vector addition of n modulo $2^{w/n}$ additions, where n is a user-definable integer.

The fourteenth step 34 of the decryption method is setting the second checksum equal to the result of the thirteenth step 33.

The fifteenth step 35 of the decryption method is stepping the first register and the second register a user-definable number of times.

If a ciphertext block has not been processed then the sixteenth step 36 of the decryption method is returning to the ninth step 29. Otherwise, proceeding to the next step.

The seventeenth step 37 of the decryption method is stepping the first register a user-definable number of times.

The eighteenth step 38 of the decryption method is combining the encrypted checksum with the result of the seventh step 27. In the preferred embodiment, the encrypted checksum is combined with the result of the seventh step 27 using a combination function that includes exclusive-or addition, modulo $2^w$ addition, and vector addition of n modulo $2^{w/n}$ additions, where n is a user-definable integer.

The nineteenth step 39 of the decryption method is decrypting the result of the eighteenth step 38 using an inverse of a method used to form the encrypted checksum.

The twentieth step 40 of the decryption method is combining the contents of the first register with the result of the nineteenth step 39. In the preferred embodiment, the contents of the first register are combined with the result of the nineteenth step 39 using a combination function that includes exclusive-or addition, modulo $2^w$ addition, and vector addition of n modulo $2^{w/n}$ additions, where n is a user-definable integer.

The twenty-first step 41 of the decryption method is comparing the second checksum to the result of the twentieth step 40.

The twenty-second, and last, step 42 of the decryption method is accepting the plaintext blocks as valid if a match is found in the twenty-first step 41. Otherwise, declaring the plaintext blocks invalid.

What is claimed is:

1. A method of packet encryption, comprising the steps of:
    (a) identifying each packet in a message to be encrypted;
    (b) assigning a unique number to each packet;
    (c) acquiring a value R of width w, where w is a user-definable integer;
    (d) initializing a first register of width w with R, where the first register is configured to step;
    (e) generating an initialization vector IV that is a function of the contents of the first register;
    (f) stepping the first register a user-definable number of times;
    (g) selecting a packet that has not been processed;
    (h) combining R and the unique number of the selected packet;
    (i) initializing a second register of width w with the result of the last step, where the second register is configured to step;
    (j) generating a checksum;
    (k) dividing the selected packet into blocks of width w, padding any block to width w if necessary;
    (l) selecting a block from the selected packet that has not been processed;
    (m) combining the checksum with the selected block and designating the result as the checksum;
    (n) encrypting the selected block as a function of the contents of the first register and the second register and designating the result as ciphertext of the selected block;
    (o) stepping the first register and the second register a user-definable number of times;
    (p) if a block in the selected packet has not been processed then returning to step (1), otherwise proceeding to the next step;
    (q) encrypting the checksum;
    (r) transmitting the unique number of the selected packet, IV, the ciphertext of each block in the selected packet, and the encrypted checksum; and
    (s) if a packet in the message has not been processed then stepping the first register a user-definable number of times and returning to step (g), otherwise stopping.

2. The method of claim 1, wherein the step of acquiring a value R of width w is comprised of the step of acquiring a value R of width w, where w is $2^n$, and where n is a user-definable integer.

3. The method of claim 1, wherein the step of acquiring a value R is comprised of the step of acquiring a value R from the group of acquiring methods consisting of key generation, key exchange, and key agreement.

4. The method of claim 1, further including the step of acquiring a cryptovariable CV and a security parameter index SPI.

5. The method of claim 1, wherein the step of initializing a first register of width w with R, where the first register is configured to step is comprised of the step of initializing a first register of width w with R, where the first register is configured to step as a primitive polynomial.

6. The method of claim 1, wherein the step of generating an initialization vector IV that is a function of the contents of the first register is comprised of the steps of:
    (a) generating an initialization vector IV that is the contents of the first register encrypted; and
    (b) stepping the first register a user-definable number of times.

7. The method of claim 6, wherein the step of generating an initialization vector IV that is the contents of the first register encrypted is comprised of the step of encrypting the contents of the first register using a codebook encryptor and CV.

8. The method of claim 7, wherein the step of encrypting the contents of the first register using a codebook encryptor and CV is comprised of the step of encrypting the contents of the first register using CV and a codebook encryptor selected from the group of codebook encryptors consisting of the Data Encryption Standard codebook encryptor, the Advanced Encryption Standard codebook encryptor, any other suitable codebook encryptor, and any equivalent encryptor.

9. The method of claim 1, wherein the step of combining R and the unique number of the selected packet is comprised of the step of combining R and the unique number of the selected packet using a combination function selected from the group of combination functions consisting of exclusive-or addition, modulo $2^w$ addition, and vector addition of n modulo $2^{w/n}$ additions, where n is a user-definable integer.

10. The method of claim 1, wherein the step of initializing a second register of width w with the result of the last step, where the second register is configured to step is comprised of the step of initializing the second register of width w with the result of the last step, where the second register is configured to step as a primitive polynomial.

11. The method of claim 4, wherein the step of generating a checksum is comprised of the step of generating a checksum by combining the unique number of the selected packet and SPI.

12. The method of claim 11, wherein the step of combining the unique number of the selected packet and SPI is comprised of the step of concatenating the unique number of the selected packet and SPI.

13. The method of claim 1, wherein the step of combining the checksum with the selected block is comprised of the step of combining the checksum with the selected block using a combination function selected from the group of combination functions consisting of exclusive-or addition, modulo $2^w$ addition, and vector addition of n modulo $2^{w/n}$ additions, where n is a user-definable integer.

14. The method of claim 4, wherein the step of encrypting the selected block as a function of the contents of the first register and the second register and designating the result as ciphertext of the selected block is comprised of the steps of:
  (a) combining the contents of the first register with the selected block;
  (b) encrypting the result of the last step using a codebook encryptor and CV; and
  (c) combining the result of the last step with the contents of the second register.

15. The method of claim 14, wherein the step of encrypting the result of the last step using a codebook encryptor is comprised of the step of encrypting the result of the last step using a codebook encryptor selected from the group of codebook encryptors consisting of the Data Encryption Standard codebook encryptor, the Advanced Encryption Standard codebook encryptor, any other suitable codebook encryptor, and any equivalent encryptor.

16. The method of claim 4, wherein the step of encrypting the checksum is comprised of the steps of:
  (a) stepping the first register a user-definable number of times;
  (b) combining the contents of the first register with the checksum;
  (c) encrypting the result of the last step using a codebook encryptor and CV; and
  (d) combining the result of the last step with the result of step (h) of claim 1.

17. The method of claim 16, wherein the step of encrypting the result of the last step using a codebook encryptor is comprised of the step of encrypting the result of the last step using a codebook encryptor selected from the group of codebook encryptors consisting of the Data Encryption Standard codebook encryptor, the Advanced Encryption Standard codebook encryptor, any other suitable codebook encryptor, and any equivalent encryptor.

18. The method of claim 11, further including the step of transmitting the SPI.

19. A method of packet decryption, comprising the steps of:
  (a) receiving a transmission of an encrypted packet, where the transmission includes a unique number for the encrypted packet, an initialization vector IV, at least one ciphertext block, and an encrypted checksum;
  (b) acquiring a value R of width w, where w is a user-definable integer, and where R is equal to a corresponding value used to create the received transmission;
  (c) setting a second checksum equal to the unique number;
  (d) decrypting IV using an inverse of a method used to form IV;
  (e) initializing a first register of width w with the result of the last step, where the first register is configured to step;
  (f) stepping the first register a number of times equal to a number of times used to form IV;
  (g) combining R and the unique number;
  (h) initializing a second register of width w with the result of the last step, where the second register is configured to step;
  (i) selecting one of said at least one ciphertext blocks;
  (j) combining the selected one of said at least one ciphertext block with the contents of the second register;
  (k) decrypting the result of the last step using an inverse of a method used to encrypt the selected one of said at least one ciphertext block;
  (l) combining the result of the last step with the contents of the first register to form a plaintext block of the selected one of said at least one ciphertext block;
  (m) combining the second checksum with the result of the last step;
  (n) setting the second checksum equal to the result of the last step;
  (o) stepping the first register and the second register a user-definable number of times;
  (p) if one of said at least one ciphertext block has not been processed then returning to step (h), otherwise proceeding to the next step;
  (q) stepping the first register a user-definable number of times;
  (r) combining the encrypted checksum with the result of step (f);
  (s) decrypting the result of the last step using an inverse of a method used to form the encrypted checksum;
  (t) combining the contents of the first register with the result of the last step;
  (u) comparing the second checksum to the result of the last step; and
  (v) accepting the plaintext blocks as valid if a match is found in the last step, otherwise declaring the plaintext blocks invalid.

20. The method of claim 19, further including the steps of:
  (a) acquiring a cryptovariable CV that is the same as a corresponding value used to create the received transmission; and
  (b) receiving a security parameter index SPI.

21. The method of claim 20, wherein the step of setting a second checksum equal to a unique number is comprised of the step of setting the second checksum to a combination of the unique number for the encrypted packet and SPI.

22. The method of claim 21, wherein the step of setting the second checksum to a combination of the unique number for the encrypted packet and SPI is comprised of the step of concatenating the unique number of the encrypted packet and SPI.

23. The method of claim 19, wherein the step of initializing a first register of width w with the result of the last step, where the first register is configured to step is comprised of the step of initializing a first register of width w with the result of the last step, where the first register is configured to step as a primitive polynomial.

24. The method of claim 19, wherein the step of combining R and the unique number is comprised of the step of combining R and the unique number using a combination function selected from the group of combination functions consisting of exclusive-or addition, modulo $2^w$ addition, and vector addition of n modulo $2^{w/n}$ additions, where n is a user-definable integer.

25. The method of claim 19, wherein the step of initializing a second register of width w with the result of the last step, where the second register is configured to step is comprised of the step of initializing a second register of width w with the result of the last step, where the second register is configured to step as a primitive polynomial.

26. The method of claim 19, wherein the step of combining the selected one of said at least one cipher block with the contents of the second register is comprised of the step of combining the selected one of said at least one cipher block with the contents of the second register using a combination function selected from the group of combination functions consisting of exclusive-or addition, modulo $2^w$ addition, and vector addition of n modulo $2^{w/n}$ additions, where n is a user-definable integer.

27. The method of claim 19, wherein the step of combining the result of the last step with the contents of the first register is comprised of the step of combining the result of the last step with the contents of the first register using a combination function selected from the group of combination functions consisting of exclusive-or addition, modulo $2^w$ addition, and vector addition of n modulo $2^{w/n}$ additions, where n is a user-definable integer.

28. The method of claim 19, wherein the step of combining the second checksum with the result of the last step is comprised of the step of combining the second checksum with the result of the last step using a combination function selected from the group of combination functions consisting of exclusive-or addition, modulo $2^w$ addition, and vector addition of n modulo $2^{w/n}$ additions, where n is a user-definable integer.

29. The method of claim 19, wherein the step of combining the encrypted checksum with the contents of the second register is comprised of the step of combining the encrypted checksum with the contents of the second register using a combination function selected from the group of combination functions consisting of exclusive-or addition, modulo $2^w$ addition, and vector addition of n modulo $2^{w/n}$ additions, where n is a user-definable integer.

30. The method of claim 19, wherein the step of combining the contents of the first register with the result of the last step is comprised of the step of combining the contents of the first register with the result of the last step using a combination function selected from the group of combination functions consisting of exclusive-or addition, modulo $2^w$ addition, and vector addition of n modulo $2^{w/n}$ additions, where n is a user-definable integer.

\* \* \* \* \*